(12) United States Patent
Lewis et al.

(10) Patent No.: US 10,466,469 B1
(45) Date of Patent: Nov. 5, 2019

(54) DISPLAY DEVICE WITH COVER STRUCTURE

(71) Applicant: Amazon Technologies, Inc., Seattle, WA (US)

(72) Inventors: Isabella Talley Lewis, San Jose, CA (US); Andrew Frederick Skipor, West Chicago, IL (US)

(73) Assignee: Amazon Technologies, Inc., Seattle, WA (US)

( * ) Notice: Subject to any disclaimer, the term of this patent is extended or adjusted under 35 U.S.C. 154(b) by 238 days.

(21) Appl. No.: 15/082,400

(22) Filed: Mar. 28, 2016

(51) Int. Cl.
*G02B 26/00* (2006.01)

(52) U.S. Cl.
CPC .................. *G02B 26/005* (2013.01)

(58) Field of Classification Search
CPC ....... H01L 2924/00; H01L 2924/12044; H01L 2924/1306; H01L 2924/15165; H01L 2924/12041; H01L 2924/1461; H01L 2924/15153; H01L 51/0097; H01L 51/56; H01L 2224/95085; H01L 24/95; H01L 2924/01005; H01L 2924/01006; H01L 2924/01013; G02F 1/133371; G02F 1/1339; G02F 1/1345; G02F 1/133553; G02F 1/133555; G02F 1/133504; G02F 1/13394; G02F 1/13454; G02F 2001/133507; G02F 2001/133565; G02F 1/133604; G02F 1/133611; G02F 1/1337; G02F 1/133707; G02F 1/133711; G02B 5/3033; G02B 3/0056; G02B 3/005; G02B 5/0231; G02B 26/005; G02B 5/3025; G02B 6/0016; G02B 6/002; G02B 6/0036; G02B 6/0061; G02B 6/0065; G02B 27/0132
USPC ................ 359/237, 242, 265–267, 270–273, 359/290–292, 295, 298, 321, 315, 322
See application file for complete search history.

(56) References Cited

U.S. PATENT DOCUMENTS

| | | | | |
|---|---|---|---|---|
| 7,936,338 B2 * | 5/2011 | Iwase | .................... | G06F 3/0418 345/173 |
| 9,804,382 B1 * | 10/2017 | Carneiro | .............. | G02B 26/005 |
| 2006/0132383 A1 * | 6/2006 | Gally | .................. | G02B 26/001 345/32 |
| 2010/0220380 A1 * | 9/2010 | Hayes | .................. | G02B 26/005 359/290 |
| 2013/0335824 A1 * | 12/2013 | Cho | .................... | G02B 5/3025 359/492.01 |
| 2014/0332774 A1 * | 11/2014 | Wu | ..................... | H01L 51/5246 257/40 |

* cited by examiner

*Primary Examiner* — Brandi N Thomas
(74) *Attorney, Agent, or Firm* — EIP US LLP (57) ABSTRACT

A display device comprising an array of display elements. A light redirection structure comprises a material shaped to from a recess having an opening in a surface of the light redirection structure. A cover structure has a surface which contacts the light redirection structure and covers the recess.

20 Claims, 3 Drawing Sheets

DISPLAY DEVICE WITH COVER STRUCTURE

BACKGROUND

A display device may include a so-called light guide for directing light towards an array of display elements. Such a light guide may have small and delicate structures for controlling the directing of the light. Such structures are susceptible to damage during manufacture, for example on exposure to high temperatures and/or pressures.

It is desirable to reduce damage to a light guide during manufacture.

DETAILED DESCRIPTION

Examples are described herein relating to a cover structure which covers a recess or a plurality of recesses of a light redirection structure. Such recesses are for example prisms filled with a gas (for example air) used to redirect incident light from a light source towards an array of display elements, such as display elements operable using electrowetting. To for example adhere a touch interface assembly to the light redirection structure, an adhesive layer such as an optically clear adhesive (OCA) may be applied to the light redirection structure. However, typically, such an OCA material has a very low Young's modulus (for example less than 3000 Pascals), compared with other materials such as polycarbonate (with a Young's modulus of for example 2 GigaPascals), which can lead to the OCA material entering the recesses and impairing their function at redirecting light. The cover structure is sufficiently rigid and is located for example on the light redirection structure, extending over and covering the recesses. The cover structure may itself have adhesive properties for adhering the touch interface assembly thereto. Or, in other examples, an adhesive layer for adhering the touch interface assembly may then be applied on the cover structure. Hence, the cover structure can protect against adhesive entering the recesses and improve the quality of the manufactured display device.

Figure 1:
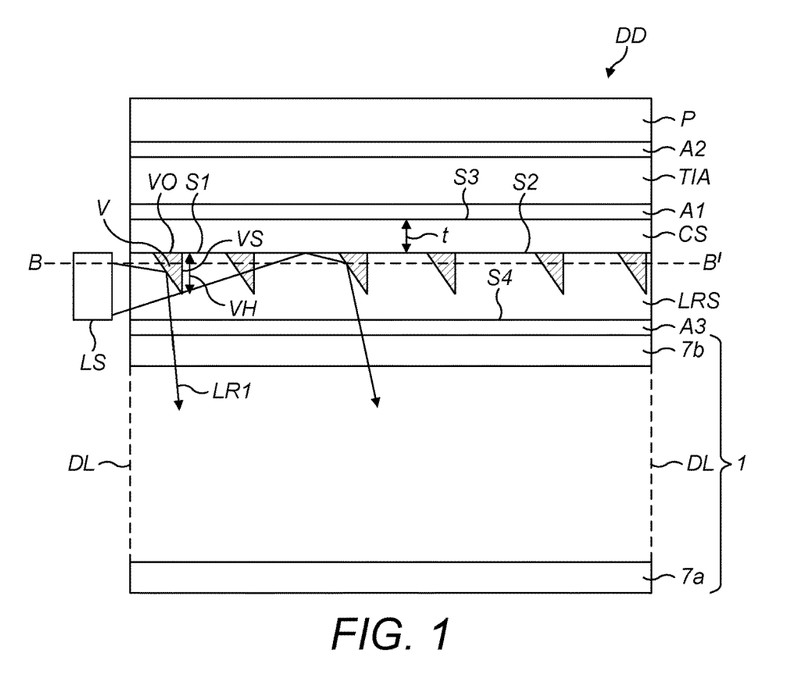
FIG. 1 shows schematically a cross-section of part of an example display device taken along A-A' of FIG. 2.

FIG. 1 shows schematically part of a display device of examples. It is to be appreciated that, for clarity, features are illustrated relevant for the description which follows. Other features which may be present are therefore not illustrated.

The display device DD is for example a display panel, for example a display assembly of various components and parts assembled together to form a single unit. This single unit may then be installed into apparatus, such as a so-called e-reader.

In examples, the display device comprises an array of display elements 1. An array is typically an arrangement, layout or distribution of the display elements, for outputting display effects which together form an output image. The array is for example a matrix with m columns and n rows of display elements, where m and n are each independently an integer. In some examples, described below, each display element is an electrowetting element of an electrowetting display (EWD). In other examples, the display element uses a different principle than electrowetting for emitting a display effect. For example, the display elements may be liquid crystal display (LCD) element, for example a reflective LCD element, or an element of an electrophoretic (EPD) display.

In examples described in relation to FIG. 1, the array of display elements 1 is illustrated schematically, for simplicity. Two substrates 7a, 7b are illustrated which are in examples outermost substrates respectively of two support plates of the array 1. The dashed lines DL schematically indicate parts of the display element between the substrates. Examples of such parts are described below, for an electrowetting element.

The display device DD further comprises a light redirection structure LRS. A light redirection structure LRS is typically a structure having optical properties for redirecting a light ray from an incident light path to a light path different from the incident light path. A light redirection structure may be for example considered to be a light guide, such as a light guide plate, for guiding or directing incident light towards a desired point or region. Such a light guide plate may have a plurality of recesses in accordance with those described below, each recess individually capable of redirecting light and contributing to the light guide plate's functionality. In examples, the light redirection structure LRS is configured to redirect incident light towards the array of display elements. The incident light may be emitted by at least one light source, for example a light emitting diode (LED) or other suitable light source which the skilled person will understand. The light source LS is illustrated in FIG. 1 adjacent a side of the light redirection structure LRS. The light source LS and light redirection structure LRS in examples such as FIG. 1 are located between a viewing surface of the display device (which viewing surface is a side of the display device to be positioned closest to a viewer) and the array of display elements. Such a lighting system (including the light source and light redirection structure LRS) may be termed a front lighting system. In other examples, the lighting system may be positioned behind the array of display elements. In other words, the array of display elements may be positioned between the viewing side and the light redirection structure LRS.

Figure 2:
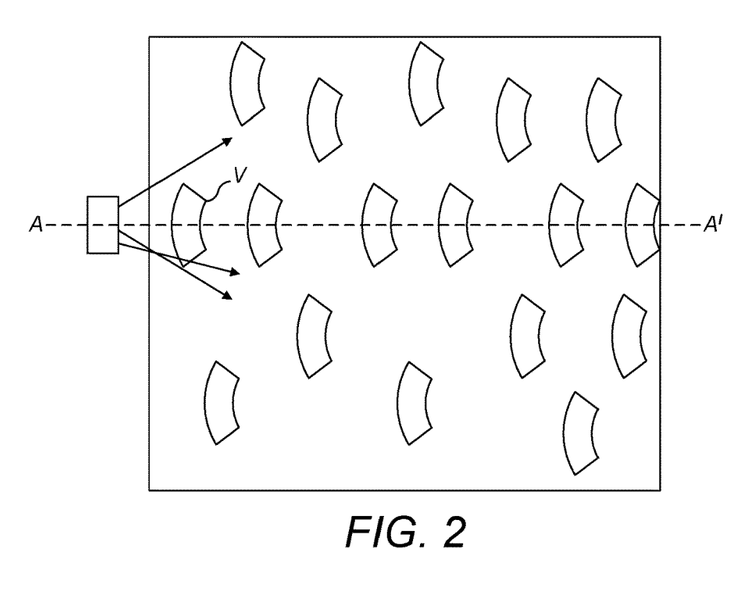
FIG. 2 shows schematically the example display device taken along B-B' of FIG. 1.

In examples described herein, and referring also to FIG. 2, the light redirection structure LRS comprises a material and may be formed of that material. The material is shaped to form the light redirection structure, including a recess V in the material. Typically a recess is a gap, hollowing, space, depression, thinning, cavity or void in the material forming the light redirection structure. The recess is shown in FIG. 1 as a shaded region. The recess has an opening VO in a surface S1 (otherwise referred to as a light redirection structure surface or the first surface) of the light redirection structure. Such an opening may be considered to be an aperture or hole in the surface S1 formed by the shape of the recess in the material.

In examples the light redirection structure, more particularly the material, has a surface VS (otherwise referred to herein as the second surface) which corresponds with a shape of the recess in the material. In other words, the shape of the second surface determines the shape of the recess. Many different shapes and dimensions of the recess are envisaged, depending on the desired optical properties of the light redirection structure LRS. For example, in examples described herein, the recess has a triangular cross section, as illustrated in FIG. 1, with a first part of the second surface angled substantially (e.g. within acceptable manufacturing tolerances) perpendicular to the surface S1. A second part of the second surface nearer the light source than the first part of the second surface, has an internal angle (taken within the recess) of less than 90 degrees, for example less than 80, less than 70, less than 60, less than 50, or less than 40 degrees. Viewing the recess in plan view, in for example a plane parallel the surface S1, as in FIG. 2, the recess forms a curved channel having along a longitudinal axis of the recess the triangular cross section described above. The curvature of the longitudinal axis, and therefore of the channel, may be selected in dependence on the desired optical properties of the recess. For example, measured from one end to the other end of the longitudinal axis, the longitudinal axis may have an internal angle of for example substantially (e.g. within acceptable measuring tolerances) 90 degrees, less than 90 degrees, less than 80 degrees, less than 70 degrees, less than 60 degrees, or less than 50 degrees. In other examples, the recess may have a cylindrical shape.

Hence, depending on the design parameters, and the desired optical properties of the recess, the shape and size of the recess is selected. For example, a height VH of the recess may be less than 10, less than 9, less than 8, less than 7, less than 6, less than 5, less than 4, or less than 3 micrometers. A length of the longitudinal axis of the recess may for example be between 5 and 20 micrometers. A width of the recess, taken perpendicular the longitudinal axis and in the plane of the surface S1, may be between 2 and 10 micrometers. Such dimensions for example are compatible with the Young's modulus of the cover structure; if a recess height or width is too large, the cover structure may not be sufficiently rigid and may encroach too much into the recesses.

The material of the light redirection structure is for example polycarbonate (available for example from Sumitomo Corporation, Harumi Island Triton Square Office Tower Y, 8-11, Harumi 1-chome, Chuo-ku, Tokyo 104-8610, Japan) or polymethyl methacrylate (PMMA) (available for example from Evonik Industries AG, Rellinghauser StraBe 1-11, 45128 Essen, Germany) and has for example a refractive index in the range of for example 1.48 to 1.6.

The recess is substantially filled with a gas, for example air. The volume of the recess is taken as the volume within the recess and limited by a plane coincident with the surface S1 of the light redirection structure. In other words, the boundaries of the recess volume correspond with the second surface and the plane coincident with the surface S1.

The gas in the recess has a refractive index selected to give the recess desired optical properties; for example, to render at least part of the second surface reflective to light from the light source. The gas is in some examples air, and in other examples is a different gas as the skilled person will understand.

Thus, with gas such as air in the recess and appropriate shaping, sizing and positioning of the recess, the recess can be used to redirect incident light emitted from the light source. Such redirection may be by refraction and/or reflection. In examples, the recess is configured to redirect light from the light source towards the array of display elements, for example a direction approximately perpendicular to the surface S1, for example by reflection with total internal reflection. By such total internal reflection, light is reflected for example with an angle of 45 degrees relative to the surface S1 and is typically reflected with an angle relative to the surface S1 between 35 degrees and 55 degrees. The angle of redirected light relative to the surface S1 may be selected (and the recess configured accordingly) to maximize light redirection from the light source to a reflector within at least one display element of the array of display elements. Thus, the second surface is shaped to redirect a light ray (such as that labelled LR1) incident on part of the second surface towards the reflector of at least one display element of the array, for example at least one electrowetting element such as those described in examples below. Such a recess may be considered to be a prism.

One recess has so far been described, however it is envisaged in examples that the light redirection structure comprises a plurality of recesses, for example the recess of examples in addition to further recesses which may each be similar in shape and size, or different, from examples of the recess above. FIG. 2 illustrates a plurality of recesses having a distribution pattern across an extent of the light redirection structure which overlaps the array of display elements. The distribution pattern may be random, or in other examples a regular or ordered pattern. Each recess may be oriented relative to a light source with the same orientation, although in other examples the orientation of some recesses may be different from others, for example to increase redirection of light from the light source.

It is to be appreciated that further features of the display device described in relation to one recess apply in further examples to the plurality of recesses. For example, where a cover structure is described as covering a recess V, the cover structure may further cover more than one and in some examples all recesses of the plurality of recesses.

In examples, the display device comprises a cover structure CS. The cover structure CS has a cover structure surface S2 in contact with the first surface S1. The cover structure covers the recess V, and in examples with a plurality of recesses, covers the plurality of recesses. With the cover structure CS covering a recess, the cover structure overlaps or otherwise extends over the recess. For example, the cover structure surface S2 is planar, for example flat within acceptable tolerances, and extends over the opening. Thus, with the first surface S1 being for example planar, the surface S1 may be substantially in contact with the plane of the cover structure surface S2. The cover structure surface S2 covers, for example entirely, the opening, thus with part of the cover structure surface 52 lying immediately adjacent to the plane of the opening in the surface S1. In this way, the cover structure surface S2 for example encloses or seals the recess, with for example the cover structure surface S2 at least partly or fully contacting an edge of the opening between the surface S1 and the second surface VS. Moreover, the cover structure in contact with the light redirection structure contributes to total internal reflection of light within the light redirection structure, at the first surface S1.

In this way, with the volume of the recess being determined by a plane coincident with the surface S1, the cover structure covers the recess and is substantially outside the recess. Typically, with the cover structure substantially outside the recess, material forming the cover structure does not encroach or enter or ingress within the volume of the recess. It is anticipated though that in some examples some portion of the cover structure material may enter within the volume of the recess, but that this is minimal, and is for example less than 10% or less than 5% of the volume recess. In such examples, the recess may be formed deeper than required for a desired light redirection function; an upper portion of the recess (which may be the less than 10% or less than 5% portion of the volume recess) may be designed as a sacrificial portion into which some of the cover structure material may ingress without detriment to the desired light redirection properties of the recess. Also, in examples, within the understanding of the cover structure being outside the volume of the recess, part of the cover structure may temporarily enter within the volume of the recess if for example the cover structure is flexed, for example due to pressure caused by a user or flexing of the display device. After such pressure is removed, the cover structure may return to a pre-flexed shape, with the cover structure again outside of the volume of the recess.

The properties of the cover structure are selected to give the cover structure a sufficiently high Young's modulus property (otherwise known as the elastic modulus, this being a relationship between stress and strain in a material). With such a property the cover structure can protect the recess from damage during a manufacturing process of the display device, for example during a lamination process to apply layers onto the cover structure. In known processes, such a cover structure is not used, and an adhesive layer is for example applied directly to a surface of a light guide. However, the adhesive layer has a notably lower Young's modulus property compared with the cover structure, and therefore processing pressures and or other forces can cause the adhesive material of the adhesive layer to enter a recess of the light guide, thus harming the functionality of the recess in the assembled display device. Hence, in examples described herein, the cover structure may act as a barrier or protective structure between the recess (or recesses) of the light redirection structure and any further layers or structures applied on and over the cover structure.

In examples, the cover structure comprises, for example is formed of, a material with a Young's modulus in the range 0.1 megaPascals (MPa) or higher while in examples still maintaining its adhesive properties For example, the cover structure has a Young's modulus of greater than a multiple of 2, for example greater than a multiple of 20, of a pressure of a lamination process for applying layers on and over the cover structure. The cover structure is for example a layer, for example a cover layer, with a minimum thickness t in the range of 8 to 20 micrometers, with the thickness taken in a direction perpendicular the cover structure surface S2. Such a thickness can for example reduce or prevent colour fringing by the cover structure while providing enough structural support to not encroach into the recess during lamination and processing pressure. The cover structure in examples has a refractive index within a range of refractive index values between the refractive index (for example 1.41) of an adhesive layer on the cover structure (to be described later) and the refractive index (for example a maximum of 1.6) of the light redirection structure material. For example the refractive index of the cover structure may be in the range of 1.4 and 1.6, for example within the range of 1.4 and 1.58, for example within the range of 1.41 and 1.56, which range includes the stated values of the upper and lower limits of the range. Hence, the refractive index of the material of the cover structure may be considered to be substantially equal to the refractive index of the adhesive layer and/or the material of the light redirection structure. The cover structure material may be selected to give a desired reflectance where the cover structure surface S2 meets the first surface S1, for redirecting light heading in a direction away from the array of display elements towards the array of display elements. The cover structure material may for example be PMMA, for example Acrylite® available from Evonik Industries AG, a polycarbonate or a photosensitive dry film available from Hitachi Chemical Company, Ltd. (Grantokyo South Tower, 1-9-2, Marunouchi, Chiyoda-ku, Tokyo, 100-6606, Japan). In some examples the cover structure comprises a composite material, for example of multiple layers of at least two different materials. The cover structure may comprise three layers with one layer of one material (for example a polycarbonate) sandwiched between two layers of a different material (for example PMMA). In such examples the middle layer (for example of polycarbonate) may be approximately 0.4 millimetres thick, and the other two layers (for example of PMMA) may each be approximately 40 micrometres thick. In other examples the cover structure may comprise two layers of different materials, for example one layer of a polycarbonate and the other layer of PMMA.

In some examples, the Young's modulus of the cover structure is selected in dependence on the thickness of the cover structure, or vice versa. For example, with a Young's modulus greater than or equal to 0.1 MPa, the cover structure thickness t is for example greater than or equal to 10 micrometers for an air filled recess with width in the order of 4 micrometres. In other examples, with a Young's modulus of 1 MPa or greater, the thickness t is for example greater than or equal to 5 micrometers for a similar width.

In various examples, different layers or structures may be located on the cover structure, on a side opposite from the side in contact with the light redirection structure. For example, with the cover structure surface S2 being a first cover structure surface, the cover structure has a second cover structure surface S3 on a side of the cover structure further from the array of display elements than the side with the first cover structure surface S2.

An adhesive layer, for example a first adhesive layer A1 is for example located on the second cover structure surface S3, for adhering at least one layer or structure to the cover structure. Such a layer may be a surface of a touch interface assembly TIA, otherwise referred to herein as a touch interface assembly surface. Such a touch interface assembly may be otherwise known in the art as a touch panel or similar, and may have various constructions. For example, a touch interface assembly comprises a plurality of layers, for example appropriate circuitry, which together form an assembly for a user to interface with apparatus comprising the display device. More specifically, the touch interface assembly can detect a position of a touch by a user's finger on an outer surface of the display device, and output data indicative of that position, to control a function or process of the apparatus, which may for example involve changing a display effect of the array of display elements in response to the position of the touch. Further details of such a touch interface assembly are not described herein, as suitable constructions will be readily understood by the skilled person.

The first adhesive layer is for example an adhesive transmissive for light in the visible spectrum. Such an adhesive may be known in the art as an optically clear adhesive (OCA), which is for example an acrylic or silicone material. The first adhesive layer may have a refractive index in the same range as that described above for the cover structure CS.

At least one further layer may be adhered on or over the touch interface assembly. For example, a second adhesive layer A2 may adhere a plate P or other substrate to a surface of the touch interface assembly furthest from the array of display elements. The plate P may be formed of glass and may form an outer surface of the display device, which is reinforced against damage from shocks or scratches. The second adhesive layer A2 may also be a so-called OCA similar to that described above.

In other examples, it is envisaged that the plate P may be adhered to the second cover structure surface S2, where a touch interface assembly is not required.

The light redirection structure in examples has a second light redirection structure surface S4 closer to the array of display elements than the first surface S1. A third adhesive layer A3 for example adheres the second light redirection structure surface to a support plate surface of a support plate of the array of display elements, for example of the substrate 7b or in other examples the substrate 7a.

Each or any of the adhesive layers have a lower Young's modulus than the cover structure material, for example in the range of 0.06 MPa to 0.003 MPa. The adhesive layers having such a lower Young's modulus helps to accommodate and reduce stresses between layers of the display device, due for example to different thermal expansion coefficients of different layers.

As explained above, the array of display elements may be an array of electrowetting elements. The light redirection structure with the recess(es) described above and the cover structure offer particular use in the field of electrowetting. For example, an electrowetting element often does not include a diffusive reflector or other structure(s) for diffusing light. Instead, as will be explained below, an electrowetting element may have a specular reflector. Without a diffusive reflector or other structure(s) for diffusing light, the light redirection structure with the recess(es) may be needed to redirect incident light more directly towards the reflector, to improve a brightness and/or contrast of the display device. The cover structure as explained above enables such a light redirection structure with the recess(es) to be manufactured for example with less damage to the recess(es). Such a light redirection structure and hence the cover structure may therefore be less useful in non-electrowetting type display elements, which for example have diffusive properties for light.

An electrowetting element in accordance with examples will now be described with reference to FIG. 3 and FIG. 4. A plurality of such an electrowetting element may together form the array, for example a matrix of electrowetting elements. Each electrowetting element of the array may respectively comprise features described below for the electrowetting element 2.

Figure 3:
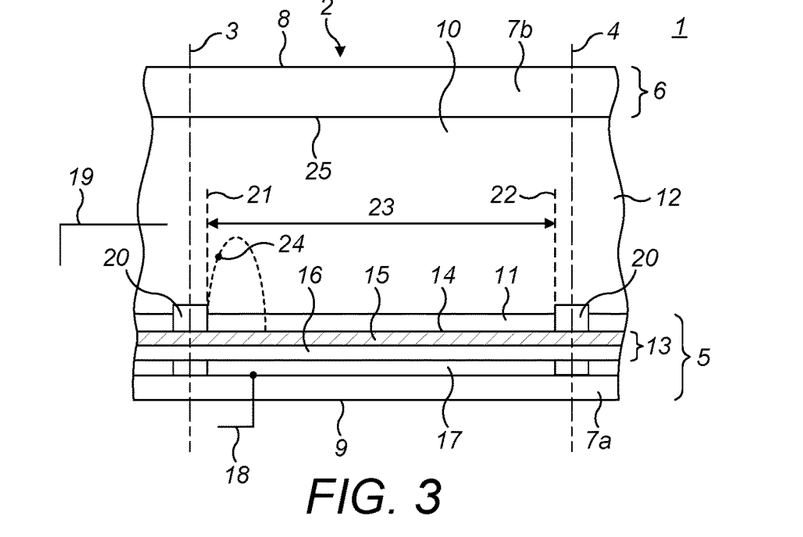
FIG. 3 shows schematically an example electrowetting display element.

FIG. 3 shows a diagrammatic cross-section of part of an electrowetting element 2 of an array of electrowetting elements 1, according to examples. Such an electrowetting element is a display element and may otherwise for example be referred to as a picture element or an electrowetting cell. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may each include a glass or polymer substrate 7a, 7b and may be rigid or flexible.

The display device has a viewing side 8 on which an image or display effect formed by the display device can be viewed and a rear side 9. In the Figure a side of the first support plate 5 corresponds with the rear side 9; a side of the second support plate 6 corresponds with the viewing side 8; alternatively, in other examples, a side of the first support plate may correspond with the viewing side. The display device may be of the reflective, transmissive or transflective type. The display device may be an active matrix driven display device. The plurality of display elements may be monochrome. For a color display device the display elements may be divided in groups, each group having a different color; alternatively, an individual display element may be able to show different colors. The viewing side is an example of a surface for receiving incident radiation for entering the display element; such a surface is for example a surface of one of the layers of the second support plate. It is to be appreciated that for clarity not all control circuitry for controlling switching of the electrowetting element is illustrated. However, the skilled person would understand suitable circuitry, for example with thin film transistors (TFT) for controlling application of a voltage to the electrowetting element.

The second support plate 6 is positioned such that a first fluid 11 and a second fluid 12 are located between the first 5 and second 6 support plates, in the space 10. The second fluid contacts part of the second support plate. At least one of the first and second fluids may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface which defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The second fluid is electrically conductive or polar and may be water, or a salt solution such as a solution of potassium chloride in water. In examples, the second fluid is polar and in some examples is electrically conductive, but in other examples is not electrically conductive. The second fluid may be transparent. The first fluid is electrically non-conductive and may for instance be an alkane like hexadecane or may be an oil such as silicone oil. The first fluid is therefore non-polar in at least some examples.

The first fluid may absorb at least a part of the optical spectrum. The first fluid may be transmissive for a part of the optical spectrum, forming a color filter. For this purpose the first fluid may be colored by addition of pigment particles or a dye. Alternatively, the first fluid may be black, for example absorb substantially all parts of the visible spectrum, or reflecting. A reflective first fluid may reflect the entire visible spectrum, making the layer appear white, or part of it, making it have a color. In some examples to be described below, the first fluid is black and therefore absorbs substantially all parts of the optical spectrum, for example in the visible light spectrum. In other examples, the first fluid is another color than black and absorbs another part of the optical spectrum, for example a sub-range of wavelengths within the visible spectrum. In other examples, the display device includes picture elements having first fluids which are respectively red, green or blue, or cyan, magenta and yellow to provide a full color display. Typically, by absorbing substantially all parts of the optical spectrum, there is nonetheless a degree of variation, therefore the first fluid may not absorb all wavelengths, but the majority of wavelengths within a given spectrum such as the visible spectrum, so as to perform the function of the first fluid in the element. The first fluid may therefore be configured to absorb substantially all light incident on the first fluid. For example the first fluid may absorb 90% or more of light in the visible spectrum and incident on the first fluid. Further properties of the first and second fluid are described below.

The support plate 5 includes an insulating layer 13. The insulating layer may be transparent or reflective. The insulating layer 13 may extend between walls 20 of a display element 2. To avoid short circuits between the second fluid 12 and electrodes arranged under the insulating layer, layers of the insulating layer may extend uninterrupted over a plurality of display elements 2, as shown in the Figure. The insulating layer has a surface 14, referred to also herein as a first support plate surface facing the space 10 of the display element 2. In this example the surface 14 is hydrophobic. The thickness of the insulating layer may be less than 2 micrometers and may be less than 1 micrometer. The surface is in contact with at least one of the first fluid or the second fluid, depending on the fluid configuration as described below. For example the first fluid contacts the surface.

The insulating layer may be a hydrophobic layer; alternatively, it may include a hydrophobic layer 15 and a barrier layer 16 with predetermined dielectric properties, the hydrophobic layer 15 facing the space 10, as shown in the Figure. The hydrophobic layer is schematically illustrated in FIG. 3 and may be formed of Teflon® AF1600. The barrier layer 16 may have a thickness, taken in a direction perpendicular to the plane of the substrate, between 5 nanometers and several micrometers, for example between 50 nanometers and 2 or 3 micrometers. In other examples the thickness may be between 50 nanometers and 500 nanometers. The barrier layer may be made of an inorganic material like silicon oxide or silicon nitride.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each electrowetting element 2, in other words display element, includes a first electrode 17 located in the first support plate 5, which electrode is at least partly overlapped by the first support plate surface 14. In examples shown there is one such electrode 17 per element. The electrode 17 is electrically insulated from the first and second fluids by the insulating layer 13; electrodes of neighboring display elements are separated by a non-conducting layer. In some examples, further layers may be arranged between the insulating layer 13 and the electrode 17. The electrode 17 can be of any desired shape or form. In examples, each display element 2 may include more than one such electrode as part of the support plate 5. The electrode 17 of a display element is supplied with voltage signals by a signal line 18, schematically indicated in the Figure. The electrode 17 may in some examples be reflective, towards which the light redirection structure is configured to redirect light.

A second signal line 19 is connected to an electrode that is in contact with the conductive second fluid 12. This electrode may be common to all elements, when they are fluidly interconnected by and share the second fluid, uninterrupted by walls. The display element 2 can be controlled by a voltage V applied between the signal lines 18 and 19, which is therefore a voltage applied to the picture element. The electrodes 17 on the substrate 7a are coupled to a control system. In a display device having the picture elements arranged in a matrix form, the electrodes can be coupled to a matrix of control lines on the substrate 7a.

The first fluid 11 in this example is confined to a display element by walls that follow the cross-section of the display element. The extent of the display element, indicated by the dashed lines 3 and 4, is defined by the center of the walls. The area of the surface 14 between the walls of a display element, indicated by the dashed lines 21 and 22, is called the display area 23, over which a display effect occurs. The display effect depends on an extent that the first and second fluids adjoin the surface defined by the display area, in dependence on the magnitude of the applied voltage V described above. The magnitude of the applied voltage V therefore determines the configuration of the first and second fluids within the electrowetting element. In other words, the display effect depends on the configuration of the first and second fluid in the display element, which configuration depends on the magnitude of the voltage applied between the electrodes of the display element. For example, for controlling the configuration of the first and second fluids, a constant potential may be applied to an electrode in contact with the conductive second fluid 12 and the magnitude of a potential applied to the electrode 17 on the substrate 7 may be controlled. The display effect gives rise to a display state of the display element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively.

Therefore, the first fluid 11 adjoins at least part of the display area 23. A size of the part of the display area adjoined by the first fluid depends on a voltage applied between the electrodes of the picture element. In examples described herein, when a zero or substantially zero voltage is applied between the electrodes, for example when the electrowetting element is in an off state, the first fluid 11 forms a layer between the walls, as shown in FIG. 3. Typically, substantially zero in examples refers to a voltage which is minimal, for example as close to zero such that the first fluid adjoins a maximum extent of the display area 23. Application of a voltage will retract the first fluid, for example against a wall as shown by the dashed shape 24 in FIG. 3. The controllable shape of the first fluid, in dependence on the magnitude of applied voltage, is used to operate the picture element as a light valve, providing a display effect over the display area 23. For example, switching the fluids to increase adjoinment of the second fluid 12 with the display area 23 may increase the brightness of the display effect provided by the element.

This display effect determines the display state of the display element which an observer will see when looking towards the viewing side of the display device. The display device is capable of providing display states from black to white, including any intermediate grey state; in a color display device, the display state may also include color.

Figure 4:
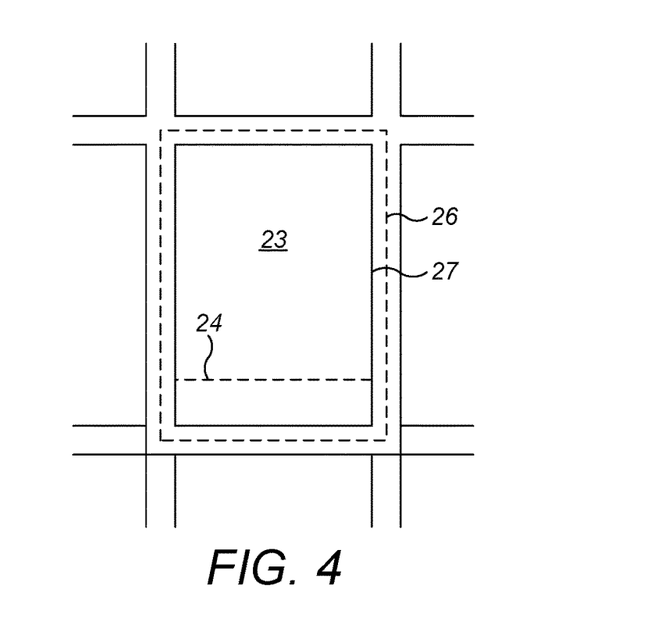
FIG. 4 shows schematically in plan view an example electrowetting display element.

Referring to FIG. 4, the lateral dimension of the central electrowetting element in FIG. 4, corresponding to the dashed lines 3 and 4 of the element 2 in FIG. 3, is indicated by the dashed line 26. Line 27 indicates the inner border of a wall; the line is also the edge, for example a perimeter, of the display area 23. The dashed line 24 marks the boundary between the first fluid 11 and the second fluid 12 when the first voltage is applied to the picture element 2.

Examples of a method of manufacturing a display device in accordance with examples described above will now be described.

A light redirection structure in accordance with examples described above is provided. This may be pre-formed, or in some examples may be manufactured by dispensing a layer of material, for example polycarbonate, partially hardening the material for example by thermal or radiation (e.g. ultraviolet radiation) curing, then patterning a surface of the partially hardened light redirection structure using for example an embossing technique to form a recess or plurality of recesses such as those described above. The embossed material may then be hardened further again for example with thermal or radiation curing, until a desired hardness is obtained.

A cover structure for example in accordance with examples described above is applied by applying a first cover structure surface S2 in contact with a light redirection structure surface of the light redirection structure, for example S1, to cover the recess or plurality of recesses.

An adhesive layer (e.g. the first adhesive layer A1) is applied on a second cover structure surface (e.g. S3) of the cover structure, to which may then be applied a further layer or layers, for example a touch interface assembly. The adhesive layer may then be hardened to bond or adhere the touch interface assembly to the cover structure. A plate (e.g. P) may then be applied to the touch interface assembly via an adhesive layer (e.g. A2) which is cured. The first adhesive layer for example enables load spreading during lamination, so that good contact of the first adhesive layer with the light redirection structure is enabled, thus improving the quality of lamination, and therefore the quality of display effect emitted through the layers over the array of display elements.

In some examples, the cover structure and the adhesive layer (e.g. the first adhesive layer A1) may be applied to each other, for example pre-laminated, before applying the cover structure to the light redirection structure and/or the further layer (e.g. the touch interface assembly) on the adhesive layer. For example, a layer of liquid material may be dispensed, then hardened (e.g. by thermal or radiation curing) to form the cover structure with a partially hardened state. The partially hardened state is sufficiently hard and rigid such that when applied to the light redirection structure surface the cover structure material does not flow or otherwise move into the recess(es), via the opening(s) when applying pressure to apply the cover structure to the light redirection structure surface. In this way the cover structure can be formed substantially outside of the recess(es). On the other hand the partially hardened cover structure may be sufficiently soft or malleable so as to mold to any surface irregularities of the light redirection structure surface, and therefore achieve an improved bond with the light redirection structure. Before applying the cover structure to the light redirection structure surface (e.g. S1), the adhesive layer may be applied on the second cover structure surface (e.g. S3). Then, the cover structure may be hardened further from the partially hardened state to a fully hardened state, which is sufficiently hard and rigid to obtain the desired Young's modulus properties described above for example so the cover structure can serve to protect against material entering into the recess(es). The further hardening of the cover structure may be performed before or after applying the cover structure to the light redirection structure surface.

A surface (e.g. S4) of the light redirection structure may be applied to a support plate surface (e.g. a surface of substrate 7b) of an array of display elements with another layer of adhesive (e.g. A3) which is cured. In this way, the light redirection structure may be applied to the array of display elements. This may be done with the pre-laminated cover structure and adhesive layer, before adhering the light redirection structure to the support plate of the array of display elements. Details of assembling a display element for example an electrowetting element described above, or an LCD element, are not described herein as suitable processes will be known to the skilled person.

Suitable pressure lamination techniques or other techniques the skilled person will understand may be used to adhere layers on or over the array of display elements, using for example the adhesive layers. A suitable dispensing technique, for example slit coating, may be used to dispense a layer of adhesive or a liquid material for being hardened to form the cover structure or the light redirection structure.

The above examples are to be understood as illustrative examples. Further examples are envisaged. For example, it is to be noted that refraction of light rays at a surface other than the second surface may not be drawn in the FIG's (which are schematic). However, the display device, including for example the recess(es) and the light redirection structure may be designed to take into account further refraction effects, so that light is redirected towards the array of display elements.

Figure 5:
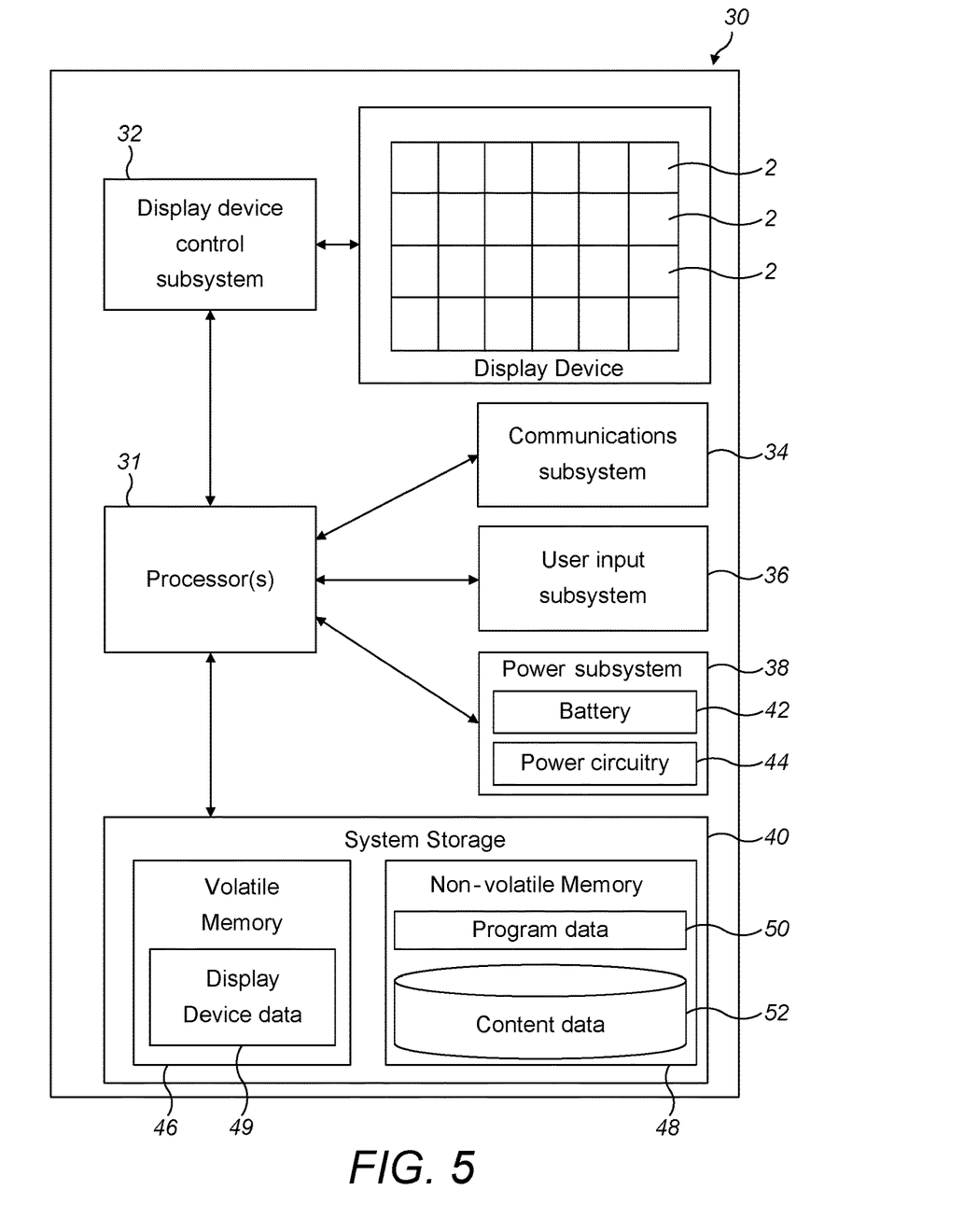
FIG. 5 shows a schematic system diagram of an example apparatus comprising a display device.

FIG. 5 shows schematically a system diagram of an example system, for example apparatus 30, comprising a display device such as the array of electrowetting elements described above. The apparatus is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 30. The apparatus includes at least one processor 31 connected to and therefore in data communication with for example: a display device control subsystem 32, a communications subsystem 34, a user input subsystem 36, a power subsystem 38 and system storage 40. The display device control subsystem is connected to and is therefore in data communication with the display device 1. The at least one processor 31 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 40. The at least one processor may additionally, or in the alternative, contain memory, such as processor registers.

The display device control subsystem 32 for example includes electrowetting display element driver components, for use in applying a voltage to any of the electrowetting display elements, to address different such display elements. In examples the electrowetting display elements are configured according to an active matrix configuration and the display device control subsystem is configured to control switching elements such as thin film transistors (TFTs) of the display device 1 via circuitry to control the electrowetting display elements. The circuitry may include signal and control lines such as those described above.

The communications subsystem 34 for example is configured for the apparatus to communicate with for example a computing device via a data network, for example a computer network such as the Internet, a local area network, a wide area network, a telecommunications network, a wired network, a wireless network, or some other type of network. The communications subsystem 34 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 36 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 38 for example includes power circuitry 42 for use in transferring and controlling power consumed by the apparatus. The power may be provided by a mains electricity supply or from a battery 44, via the power circuitry. The power circuitry may further be used for charging the battery from a mains electricity supply.

The system storage 40 includes at least one memory, for example at least one of volatile memory 46 and non-volatile memory 48 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a display effect provided by the electrowetting display device.

In the example of FIG. 5, the volatile memory 46 stores for example display device data 49 which is indicative of display effects to be provided by the display device 1. The processor 31 may transmit data, based on the display device data, to the display device control subsystem 32 which in turn outputs signals to the display device for applying voltages to the display elements, for providing display effects from the display device. The non-volatile memory 48 stores for example program data 50 and/or content data 52. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

It is to be understood that any feature described in relation to any one example may be used alone, or in combination with other features described and may also be used in combination with one or more features of any other of the example, or any combination of any other of the examples. Furthermore, equivalents and modifications not described above may also be employed without departing from the scope of the accompanying claims.

What is claimed is:
1. A display device comprising:
a light source;
an array of display elements;
a light redirection structure having a first surface, a second surface, and comprising:
a material shaped to have a recess, the recess having an opening in the first surface and substantially filled with gas, the second surface corresponding to a shape of the recess, at least part of the second surface angled to reflect light from the light source towards the array of display elements; and
a cover structure having a cover structure surface in contact with the first surface, the cover structure covering the recess.
2. The display device according to claim 1, wherein the cover structure is substantially outside the recess.
3. The display device according to claim 1, the light redirection structure comprising, in addition to the recess, a plurality of recesses each respectively having an opening in the first surface, the first surface being planar, wherein the cover structure surface is planar and extends over the opening of the recess and each opening of the plurality of recesses.

4. The display device according to claim 1, the cover structure at least partly comprising a material with a Young's modulus of 0.1 MPa or higher.

5. The display device according to claim 1, the cover structure having a thickness of 8 to 20 micrometers.

6. The display device according to claim 1, the cover structure at least partly comprising at least one of polymethyl methacrylate (PMMA), polycarbonate or a photosensitive dry film.

7. The display device according to claim 1, wherein the gas is air.

8. The display device according to claim 1, the array of display elements being an array of electrowetting elements comprising:
a first support plate; and
a second support plate,
each electrowetting element of the array of electrowetting elements respectively comprising:
a first fluid in contact with part of the first support plate;
a second fluid immiscible with the first fluid and in contact with part of the second support plate; and
an electrode located in the first support plate.

9. The display device according to claim 8, wherein each electrowetting element of the array of electrowetting elements respectively comprises a reflector, the second surface shaped to reflect a light ray incident on the second surface towards the reflector of at least one electrowetting element of the array of electrowetting elements.

10. The display device according to claim 9, wherein for each electrowetting element of the array of electrowetting elements, respectively, the reflector is the electrode.

11. The display device according to claim 1, the cover structure surface being a first cover structure surface, the cover structure comprising a second cover structure surface, the display device further comprising:
a touch interface assembly having a touch interface assembly surface;
an adhesive layer, the touch interface assembly surface adhered to the second cover structure surface by the adhesive layer.

12. An apparatus comprising:
a light source;
an array of electrowetting elements comprising:
a first support plate; and
a second support plate,
each electrowetting element of the array of electrowetting elements respectively comprising:
a first fluid in contact with part of the first support plate;
a second fluid immiscible with the first fluid and in contact with part of the second support plate; and
an electrode located in the first support plate,
a light redirection structure having a first surface, a second surface, and comprising:
a material shaped to have a recess, the recess having an opening in the first surface, the second surface corresponding to a shape of the recess, at least part of the second surface angled to reflect light from the light source towards the array of electrowetting elements;
a cover structure having a cover structure surface in contact with the first surface, the cover structure covering the recess;
a touch interface assembly having a touch interface assembly surface;
at least one processor; and
at least one memory comprising computer instructions, the at least one memory and the computer program instructions configured to, with the at least one processor, control a configuration of the first fluid and the second fluid of each electrowetting element of the array of electrowetting elements.

13. The apparatus of claim 12, the cover structure at least partly comprising a material with a Young's modulus of 0.1 MPa or higher.

14. The apparatus of claim 12, the cover structure having a thickness of 8 to 20 micrometers.

15. The apparatus of claim 12, the cover structure at least partly comprising at least one of polymethyl methacrylate (PMMA), polycarbonate or a photosensitive dry film.

16. An electrowetting display device comprising:
a light source;
an array of electrowetting elements comprising:
a first support plate; and
a second support plate,
each electrowetting element of the array of electrowetting elements respectively comprising:
a first fluid in contact with part of the first support plate;
a second fluid immiscible with the first fluid and in contact with part of the second support plate; and
an electrode located in the first support plate;
a light redirection structure having a first surface, a second surface, and comprising:
a material shaped to have a recess, the recess having an opening in the first surface, the second surface corresponding to a shape of the recess, at least part of the second surface angled to reflect light from the light source towards the array of electrowetting elements;
a cover structure having a cover structure surface in contact with the first surface, the cover structure covering the recess.

17. The electrowetting display device of claim 16, wherein the cover structure is substantially outside the recess.

18. The electrowetting display device of 16, the light redirection structure comprising, in addition to the recess, a plurality of recesses each respectively having an opening in the first surface, the first surface being planar, wherein the cover structure surface is planar and extends over the opening of the recess and each opening of the plurality of recesses.

19. The electrowetting display device of claim 16, the cover structure at least partly comprising a material with a Young's module of 0.1 MPa or higher.

20. The electrowetting display device according to claim 16, the cover structure having a thickness of 8 to 20 micrometers.

* * * * *